United States Patent [19]

Ueno

[11] Patent Number: 4,820,782

[45] Date of Patent: Apr. 11, 1989

[54] ARTICLE HAVING THERMAL RECOVERY PROPERTY

[75] Inventor: Keiji Ueno, Osaka, Japan

[73] Assignee: Sumitomo Electric Industries, Ltd., Osaka, Japan

[21] Appl. No.: 938,917

[22] Filed: Dec. 8, 1986

[30] Foreign Application Priority Data

Dec. 9, 1985 [JP] Japan ............................... 60-277472
Dec. 9, 1985 [JP] Japan ............................... 60-277473

[51] Int. Cl.$^4$ ........................................... C08F 283/00
[52] U.S. Cl. .................................. 525/454; 525/455; 522/79; 522/81; 522/142; 524/371; 524/412; 524/921
[58] Field of Search ................... 522/142, 117, 79, 81; 524/412, 371, 921; 525/454, 455

[56] References Cited

U.S. PATENT DOCUMENTS

| | | | |
|---|---|---|---|
| 3,396,210 | 8/1968 | McKillip et al. | 525/440 |
| 3,624,045 | 11/1971 | Stivers | 522/137 |
| 3,951,657 | 4/1976 | Recchia et al. | 430/288 |
| 4,052,356 | 10/1977 | Breitenfellner | 524/412 |
| 4,177,074 | 12/1979 | Proskow | 522/117 |
| 4,187,159 | 2/1980 | Goswami | 522/117 |
| 4,271,259 | 6/1981 | Breslow | 522/117 |
| 4,337,130 | 6/1982 | Ahramjian | 522/142 |
| 4,397,974 | 8/1983 | Goyert et al. | 524/143 |
| 4,408,023 | 10/1983 | Gould et al. | 525/454 |
| 4,454,309 | 6/1984 | Gould | 522/142 |

FOREIGN PATENT DOCUMENTS 3412002 12/1985 European Pat. Off. .
0214602 3/1987 European Pat. Off. .

*Primary Examiner*—Lewis T. Jacobs
*Assistant Examiner*—David Buttner
*Attorney, Agent, or Firm*—Sughrue, Mion, Zinn, Macpeak & Seas

[57] ABSTRACT

A shaped article having a thermal recovery property comprising a urethane resin composition, wherein said urethane resin composition comprises 100 parts by weight of a thermoplastic urethane resin and from 0.1 to 50 parts by weight of at least one polyfunctional monomer selected from the group consisting of trimethylolpropane triacrylate, trimethylolpropane trimethacrylate, and triacrylformal, said composition is irradiated with electron beams or gamma-rays for a total dose of from 3 to 50 Mrad, subsequently deformed at a temperature not lower than the softening point of said composition, and then cooled to a temperature lower than said softening point while maintaining the deformed shape of said resin composition.

9 Claims, No Drawings

ARTICLE HAVING THERMAL RECOVERY PROPERTY

FIELD OF THE INVENTION

The present invention relates to an article having a thermal reovery property comprising a radiation-crosslinked urethane resin composition, which article has an improved shape-retaining property and flame retardancy.

BACKGROUND OF THE INVENTION

Thermoplastic urethane resins which have superior mechanical strength and wear-resisting properties are employed in the production of various articles such as hoses, belts, and coatings for electric cables, pipes and many other shaped articles. However, thermoplastic urethane resins are inflammable and cannot be used in applications where flame retardancy is required.

Articles having a thermal recovery property such as heat-shrinkable tubing are generally produced by the method in which a tube formed of a crosslinked crystalline polymer such as polyethylene is expanded to a predetermined diameter while heating to a temperature not higher than the melting point of the polymer, and the expanded tube is cooled intact to a temperature below the melting point while maintaining its shape (i.e., shape-memory effect). Details of this method are described in e.g., U.S. Pat. No. 3,086,242.

Polyurethane-based articles having such a thermal recovery property are known (e.g., described in U.S. Pat. No. 3,624,045) and one may try to fabricate heat-shrinkable tubing from thermoplastic urethane resins with a view to making use of their superior mechanical strength and wear-resisting properties. However, if urethane resins are directly heated to their heat deformation temperature (e.g., about 180° C.) or higher, they will melt and this will cause difficulty when an attempt is made to expand them. In addition, unmodified urethane resins are not adapted to applications where flame retardancy is required.

While several methods have been proposed for improving such properties of high-molecular weight materials as heat resistance, crosslinking between molecules is general in the area of polyethylene. This method for crosslinking the molecules of a polymer is conventionally achieved by various methods, e.g., chemical crosslinking with an organic peroxide; radiation crosslinking such as with electron beams or gamma-rays; and water crosslinking with a reactive silane. However, the chemical crosslinking and water crosslinking methods are not completely suitable for the purpose of crosslinking thermoplastic urethane resins for the two principal reasons that the resins require a temperature of at least 180° C. for molding into a desired shape, but this temperature is higher than the decomposition point of organic peroxides, and it is difficult to control accurately the addition reaction of reactive silane compounds.

The present inventors therefore made concerted efforts in order to crosslink thermoplastic urethane resins so as to render them suitable for use as a material for fabricating articles having a thermal recovery property, such as heat-shrinkable tubing. The present inventors also studied the possibility of imparting flame retardancy to thermoplastic urethane resins.

SUMMARY OF THE INVENTION

Therefore, in accordance with the present invention, there is now provided a shaped article having a thermal recovery property which is made of a urethane resin composition, said urethane resin composition being composed of 100 parts by weight of a thermoplastic urethane resin and from 0.1 to 50 parts by weight of a polyfunctional monomer selected from the group consisting of trimethylolpropane triacrylate, trimethylolpropane trimethacrylate and triacrylformal, said composition being irradiated with electron beams or gamma-rays for a total dose of from 3 to 50 Mrad, subsequently deformed at a temperature not lower than its softening point, and cooled to a temperature lower than said softening point so that said resin composition is capable of retaining its deformed shape to thus have a thermal recovery property imparted thereto.

According to another aspect of the present invention, a shaped article is provided having a thermal recovery property comprising a urethane resin composition, said urethane resin composition being composed of (1) a thermoplastic urethane resin, (2) a polyfunctional monomer selected from the group consisting of trimethylolpropane triacrylate, trimethylolpropane trimethacrylate, and triacrylformal, and (3) decabromodiphenyl ether and antimony trioxide, said composition being irradiated with electron beams or gamma-rays for a total dose of from 3 to 50 Mrad, subsequently deformed at a temperature not lower than its softening point, and cooled to a temperature lower than said softening point so that said resin composition is capable of retaining its deformed shape and thus have a thermal recovery property imparted thereto.

DETAILED DESCRIPTION OF THE INVENTION

Radiation-initiated crosslinking is most commonly achieved with a reactive polyfunctional monomer added to a resin in order to accelerate crosslinking reactions upon radiation. It has generally been thought that higher efficiency in the acceleration of crosslinking is attained by a polyfunctional monomer which have a large number of functional groups and a low molecular weight per functional group. Examples of polyfunctional monomers which are conventionally used include diacrylate monomers such as diethylene glycol diacrylate; dimethacrylate monomers such as ethylene glycol dimethacrylate; triacrylate monomers such as trimethylolethane triacrylate and trimethylolpropane trimethacrylate; and triallyl cyanurate, triallyl isocyanurate, diallyl phthalate, trimethylmethacryl isocyanurate, trimethylacryl cyanurate, trimethylacryl isocyanurate, and triacrylformal.

The present inventors conducted runs of an experiment wherein the above-listed polyfunctional monomers were added to thermoplastic urethane resins and the resulting compositions were subjected to crosslinking with radiation. To the great surprise of the inventors, all the urethane resin compositions incorporating the polyfunctional monomers other than trimethylolpropane trimethacrylate, trimethylolpropane triacrylate, and triacrylformal deformed completely when they were subjected to a thermal deformation test at 180° C. The three exceptions has the following molecular weights per functional group: trimethylolpropane trimethacrylate (Mw=338), 112.6; trimethylolpropane triacrylate (Mw=296), 98.7; and triacrylformal (Mw=249), 83. On the other hand, triallyl cyanurate and triallyl isocyanurate (Mw =249) each has a molecular weight of 83 per functional group. Based on the foregoing numbers, one may have supposed that for a given addition amount, triallyl isocyanurate would have a larger molar number of functional groups, and hence would achieve a greater degree of crosslinking than trimethylolpropane trimethacrylate; it would therefore have been reasonable to assume that compositions crosslinked in the presence of triallyl cyanurate and isocyanurate would undergo less deformation when heated at 180° C. In fact, however, the improvement in resistance to thermal deformation as achieved by crosslinking with radiation is observed only in those urethane resins compositions incorporating trimethylolpropane trimethacrylate, trimethylolpropane triacrylate, and triacrylformal.

The three polyfunctional monomers specified above are preferably incorporated in a thermoplastic urethane resin in amounts of from 1 to 20 parts by weight per 100 parts by weight of the thermoplastic urethane resin. For the purpose of attaining good miscibility with the thermoplastic urethane resin and improving the properties of the resulting composition (in particular, minimizing the degree of reduction in elongation), it is more preferable that the polyfunctional monomers are incorporated in amounts of from 3 to 10 parts by weight, particularly preferably from 5 to 10 parts by weight, per 100 parts by weight of the thermoplastic urethane resin.

The thermoplastic urethane resins which are preferably used in the present invention are classified as being one of the following three types, that is 1) an aliphatic ester type which comprises an aliphatic acid such as adipic acid with a glycol such as ethylene glycol, propylene glycol, or or butylene glycols, and an isocyanate; 2) a lactam type which comprises of a glycol, a lactone such as ε-caprolactam, and an isocyanate; and 3) an ether type which comprises polyoxypropylene glycol or poly(oxypropylene)poly(oxyethylene)glycol, and an isocyanate.

Generally, flame retardancy can be attained by addition of halogen compounds. As a result of experimentation with various halogen compounds, the present inventors have found that decabromodiphenyl ether is most effective because it caused the least adverse effect on crosslinking upon irradiation. It is well known that the ability of halogen compounds to provide increased flame retardancy is appreciably enhanced when they are used in combination with antimony trioxide.

The degree of flame retardancy of the article of the present invention can be controlled by the added amounts of decabromodiphenyl ether and antimony trioxide.

The thermoplastic urethane resin composition is exposed to radiation for a total dose within the range of from 3 to 50 Mrad, preferably within the range of from 5 to 25 Mrad. If the dose of radiation is less than 3 Mrad, it is insufficient to achieve satisfactory crosslinking and the irradiated composition fails completely in a thermal deformation test at 180° C. If, on the other hand, the dose exceeds 50 Mrad, the mechanical strength of the composition drop to an impracticably low level.

The shaped article having a thermal recovery property according to the present invention can be formed into various shapes such as a tube, cap, tape, sheet, etc.

The following examples are provided for the purpose of further illustrating the present invention but should in no sense be taken as limiting.

EXAMPLES 1 TO 10

Thermoplastic urethane resin based compositions having the formulations shown in Table 1 were extruded by a conventional method into tubes having an inside diameter of 5 mm and a wall thickness of 1 mm. The tubes were exposed to electron beams at an acceleration voltage of 2 MeV for a total dose of 2.5, 5 or 15 Mrad. Thereafter, the tubes were heated in an electric heating furnace to a temperature of, e.g., 180° C., which was higher than the softening point of the specific urethane resin composition. The heated tubes were inflated to an inside diameter of 10 mm by applying an internal pressure in dies having a predetermined diameter. The inflated tubes were quenched to make heat-shrinkable tubes.

In Examples 6 to 10, flame-retardant tubes were fabricated by similar procedures from the formulations shown in Table 2.

The workability into heat-shrinkable tubes was evaluated by examining whether any change would occur in their inside diameter one week after inflation to twice the initial value by application of internal pressure within dies.

In Examples 6 to 10, uninflated tubes formed from the flame-retardant polyurethane resin comositions were subjected to a horizontal combustion test as follows in accordance with the JASO (Japanese Automobile Standard Organization, JASE). The results are shown in Table 2. The horizontal combustion test conducted by exposing a sample held horizontally to the flame (ca. 13 cm high) from a Bunsen burner for 10 seconds to set it on fire and the time necessary for the fire to become extinguished was measured.

COMPARATIVE SAMPLES 1 TO 6

Thermoplastic urethane resin compositions having the formulations shown in Tables 1 and 2 were extruded into tubes in the same manner as in Examples 1 to 10 and the tubes were exposed to electron beams for a total dose of 2.5, 5 or 15.0 Mrad. When irradiated tubes were subsequently expanded in the same manner as in the Examples, they melted and it was impossible to form a heat-shrinkable tube. As shown in Table 2, no heat-shrinkable tube could be formed from any of the comparative flame-retardant urethane resin compositions. Unexpanded tubes formed of the flame-retardant resin compositions were subjected to a horizontal combustion test as in Examples 6 to 10, the results of which are shown in Table 2.

TABLE 1

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Urethane resin |  |  |  |  |  |  |  |  |
| (E385[1]) | 100 (parts) | 100 | 100 | — | — | 100 | 100 | 100 |
| (E585[2]) | — | — | — | 100 | — | — | — | — |
| (E185[3]) | — | — | — | — | 100 | — | — | — |
| TAF[4] | 5 | — | — | — | — | — | — | — |
| TMPTM[5] | — | 5 | — | 5 | 4 | — | — | — |

TABLE 1-continued

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| TMPTA[6] | — | — | 5 | — | — | — | — | — |
| TAIC[7] | — | — | — | — | — | 5 | — | — |
| TAC[8] | — | — | — | — | — | — | 5 | — |
| Heat-shrinkable tube workability[10] | | | | | | | | |
| unirradiated | X | X | X | X | X | X | X | X |
| 2.5 (Mrad) | X | X | X | X | X | X | X | X |
| 5.0 | O | O | O | O | O | X | X | X |
| 15.0 | O | O | O | O | O | X | X | X |

TABLE 2

|  | Ex. 6 | Ex. 7 | Ex. 8 | Ex. 9 | Ex. 10 | Comp. Ex. 4 | Comp. Ex. 5 | Comp. Ex. 6 |
|---|---|---|---|---|---|---|---|---|
| Urethane resin | | | | | | | | |
| (E385)[1] | 100 (parts) | 100 | 100 | — | — | 100 | 100 | 100 |
| (E585)[2] | — | — | — | 100 | — | — | — | — |
| (E185)[3] | — | — | — | — | 100 | — | — | — |
| TAF[4] | 5 | — | — | — | — | — | — | — |
| TMPTM[5] | — | 5 | — | 5 | 5 | — | — | — |
| TMPTA[6] | — | — | 5 | — | — | — | — | — |
| TAIC[7] | — | — | — | — | — | 5 | — | — |
| TAC[8] | — | — | — | — | — | — | 5 | — |
| DBPP[9] | 30 | 30 | 30 | 30 | 30 | 30 | 30 | 30 |
| antimony trioxide | 10 | 10 | 10 | 10 | 10 | 10 | 10 | 10 |
| Heat-shrinkable tube workability[10] | | | | | | | | |
| unirradiated | X | X | X | X | X | X | X | X |
| 2.5 (Mrad) | X | X | X | X | X | X | X | X |
| 5.0 | O | O | O | O | O | X | X | X |
| 15.0 | O | O | O | O | O | X | X | X |
| Horizontal combustion time (sec) | 3 | 2 | 3 | 2 | 2 | 1 | 2 | 3 |

Notes:
[1]ether based urethane resin (Elastollan E 385, trademark of Nippon Elastollan Industries, Ltd.)
[2]caprolactam based urethane resin (Elastollan E 585, trade name of Nippon Elastollan Industries, Ltd.)
[3]aliphatic acid ester based urethane resin (Elastollan E 185, trade name of Nippon Elastollan Industries, Ltd.)
[4]triacrylformal
[5]trimethylolpropane trimethacrylate
[6]trimethylolpropane triacrylate
[7]triallyl isocyanurate
[8]triallyl cyanurate
[9]decabromodiphenyl ether
[10]O, was inflatable; X, melted and was uninflatable.

In accordance with the present invention, an article having a thermal recovery property can be produced by incorporating at least one of the specified polyfunctional monomers in a thermoplastic urethane resin. The article can be provided with an appreciably high level of flame retardancy by further incorporating decabromodiphenyl ether and antimony trioxide, and this can be achieved without causing any significantly adverse effects on the efficiency of crosslinking with irradiation. In either case, the article retains the inherent superior mechanical strength and wear-resisting properties of the urethane resin.

While the invention has been described in detail and with reference to specific examples thereof, it will be apparent to one skilled in the art that various changes and modifications can be made therein without departing from the spirit and scope thereof.

What is claimed is:

1. A shaped article having a thermal recovery property comprising a urethane resin composition, wherein said urethane resin composition comprises 100 parts by weight of a thermoplastic urethane resin and from 0.1 to 50 parts by weight of at least one polyfunctional monomer selected from the group consisting of trimethylolpropane triacrylate, trimethylolpropane trimethacrylate, and triacrylformal, said composition is irradiated with electron beams or gamma-rays for a total dose of from 3 to 50 Mrad, subsequently deformed at a temperature not lower than the softening point of said composition, and then cooled to a temperature lower than said softening point while maintaining the deformed shape of said resin composition.

2. A shaped article having a thermal recovery property as in claim 1, wherein said polyfunctional monomer is incorporated in the composition in an amount of from 1 to 20 parts by weight per 100 parts by weight of said thermoplastic urethane resin.

3. A shaped article having a thermal recovery property as in claim 2, wherein said polyfunctional monomer is incorporated in the composition in an amount of from 3 to 10 parts by weight per 100 parts by weight of said thermoplastic urethane resin.

4. A shaped article having a thermal recovery property as in claim 3, wherein said polyfunctional monomer is incorporated in the composition in an amount of from 5 to 10 parts by weight per 100 parts by weight of said thermoplastic urethane resin.

5. A shaped article having a thermal recovery property as in claim 1, wherein said shaped article having a thermal recovery property further comprises decabromodiphenyl ether.

6. A shaped article having a thermal recovery property as in claim 1, wherein said shaped article having a thermal recovery property further comprises antimony trioxide.

7. A shaped article having a thermal recovery property as in claim 1, wherein said composition is irradiated with electron beams or gamma-rays for a total dose of from 5 to 25 Mrad.

8. A shaped article as in claim 1, wherein the thermal deformation temperature is 180° C. or higher.

9. A shaped article as in claim 1, wherein said urethane resin composition is the reaction product of an isocyanate and at least one selected from the group consisting of polyoxypropylene glycol, poly(oxypropylene)poly(oxyethylene)glycol, a product of an aliphatic acid and a glycol, and a lactam.

* * * * *